(12) United States Patent  
Long

(10) Patent No.: US 7,322,248 B1
(45) Date of Patent: Jan. 29, 2008

(54) PRESSURE GAUGE FOR ORGANIC MATERIALS

(75) Inventor: Michael Long, Hilton, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 11/467,936

(22) Filed: Aug. 29, 2006

(51) Int. Cl.
*G01L 21/12* (2006.01)
(52) U.S. Cl. .................. 73/755; 324/610
(58) Field of Classification Search .......... 73/755; 324/610
See application file for complete search history.

(56) References Cited

U.S. PATENT DOCUMENTS

| | | | | |
|---|---|---|---|---|
| 4,995,264 A | * | 2/1991 | Stocker et al. ............ | 73/702 |
| 5,033,306 A | * | 7/1991 | Tamura .................... | 73/755 |
| 5,633,465 A | * | 5/1997 | Kaufmann et al. ......... | 73/755 |
| 6,727,709 B2 | * | 4/2004 | Jeong et al. .............. | 324/610 |
| 6,784,605 B2 | | 8/2004 | Sakai et al. | |
| 2002/0163345 A1 | * | 11/2002 | Jeong et al. .............. | 324/610 |

\* cited by examiner

*Primary Examiner*—Andre J. Allen
(74) *Attorney, Agent, or Firm*—Raymond L. Owens

(57) ABSTRACT

A vacuum gauge of the Pirani type for measuring the pressure of vaporized organic or inorganic material used in forming a layer of a device, comprising: an extended filament having a thickness of 5 microns or less and having a temperature coefficient of resistance greater than 0.0035/° C., the filament being subject to the vaporized organic or inorganic material; means for applying a current to the filament so that the temperature of the filament is less than 650° C. so as not to degrade the molecular structure of the organic material; and a structure responsive to a change in resistance or a change in current to determine heat loss from the filament, which is a function of the pressure of the vaporized organic or inorganic material.

8 Claims, 8 Drawing Sheets

PRESSURE GAUGE FOR ORGANIC MATERIALS

FIELD OF THE INVENTION

The present invention relates to an apparatus for measuring the pressure of vaporized organic or inorganic material.

BACKGROUND OF THE INVENTION

Physical vapor deposition in a vacuum environment is the principal means of depositing thin organic material films as used in small molecule OLED devices. Such methods are well known. It is necessary to know the deposition rate of material to control the final thickness of the desired layer. Vapor deposition systems have often relied upon crystal quartz monitors to determine the deposition rate of a material being vaporized. The vapor condenses on a vibrating quartz element, changing the mass and stiffness of the vibrating element. This disturbance is converted into a signal proportional to the thickness of the condensed material deposited on the vibrating element. These sensors can provide reliable deposition rate and deposited thickness information when the film deposited on their surface is very thin, adheres well to the surface, and has a high density, but their accuracy diminishes rapidly as the deposited film thickness increases. This problem is especially troublesome with low-density films such as with organic materials and has necessitated frequent replacement of the vibrating element and disruption of the manufacturing process. At low deposition rates, the disruption in the manufacturing process has been minimized through the use of a turreted sensor assembly that rotates a new sensor into position when the active element has reached the end of its useful accumulation range. Shutters have also been used to extend the lifetime of a crystal quartz monitor, but no deposition rate information is collected when the shutter is closed, and the accumulated film thickness information is lost. At high deposition rates, both of these solutions are inadequate since the vaporized material reaches a critical thickness on the monitor in a short period of time.

Since the deposition rate of a vaporized organic material from a manifold will depend upon the pressure of the vaporized organic material within the manifold, it is possible to measure the pressure and relate it to the deposition rate. One well-known method of determining the pressure of a gas under vacuum conditions is a Pirani gauge, which measures the heat lost by an electrically heated wire in the gas. Since the thermal conductivity of a gas varies linearly with pressure over a range of pressures, the rate at which the wire loses heat to its surroundings is a function of the gas pressure, and can thus be calibrated to the pressure of the gas present. The wire in a Pirani gauge is typically the variable resistance element in one arm of a Wheatstone bridge circuit. The gauge can be operated in constant temperature, constant voltage, or constant current mode. In the constant temperature mode, the power required to keep the wire at a constant temperature varies with changes in gas pressure, and thus the power supplied acts as a measure of the vacuum. In the constant current and constant voltage modes, the voltage or current respectively acts as a measure of the pressure. In these two modes, the temperature of the wire decreases as the pressure increases. This has the undesirable effect of decreasing the sensitivity of the pressure sensor at higher pressures.

However, standard Pirani gauges have several difficulties in measuring the pressures necessary to achieve the thin films of organic materials desired in an OLED device. Standard Pirani gauges are not always sufficiently sensitive to the pressures required for such coatings when the gauge is heated above the condensation temperature of the organic vapor. To improve the sensitivity of the gauge, it is often necessary to raise the temperature of the wire far above the temperatures of the surroundings. For example, the sensing wire in some commercial Pirani gauges are to be run near 1700° C. Temperatures this high are completely unsuitable for measuring organic materials, which will often decompose at this temperature, leading to loss of costly material, as well as carbon deposition onto the incipient device and the coating apparatus.

A need therefore exists for a way of measuring the deposition rate in vapor deposition systems that overcomes the limitations of the prior art.

SUMMARY OF THE INVENTION

It is therefore an object of the present invention to provide an effective means of determining the deposition rate in vapor deposition systems, extended operation without degradation of the sensor performance, and reduced risk of organic or inorganic material decomposition.

This object is achieved by a vacuum gauge of the Pirani type for measuring the pressure of vaporized organic material used in forming a layer of a device, comprising:

a) an extended filament having a thickness of 5 microns or less and having a temperature coefficient of resistance greater than 0.0035/° C., the filament being subject to the vaporized organic or inorganic material;

b) means for applying a current to the filament so that the temperature of the filament is less than 650° C. so as not to degrade the molecular structure of the organic material; and c) means responsive to a change in resistance or a change in current to determine heat loss from the filament which is a function of the pressure of the vaporized organic or inorganic material.

ADVANTAGES

It is an advantage of this invention that it can measure the pressure, and thus the deposition rate, of organic or inorganic materials while significantly reducing the risk of organic material degradation. It is a further advantage of this invention that it can measure the pressure of vaporized organic or inorganic materials with effective sensitivity to the pressure. It is a further advantage of this invention that it can be used to continuously measure the deposition rate over extended periods of operation without loss of sensitivity because no material condenses on the sensor. The pressure sensor can additionally be used as a temperature sensor when the filament is not driven with an external current.

DETAILED DESCRIPTION OF THE INVENTION

Figure 1:
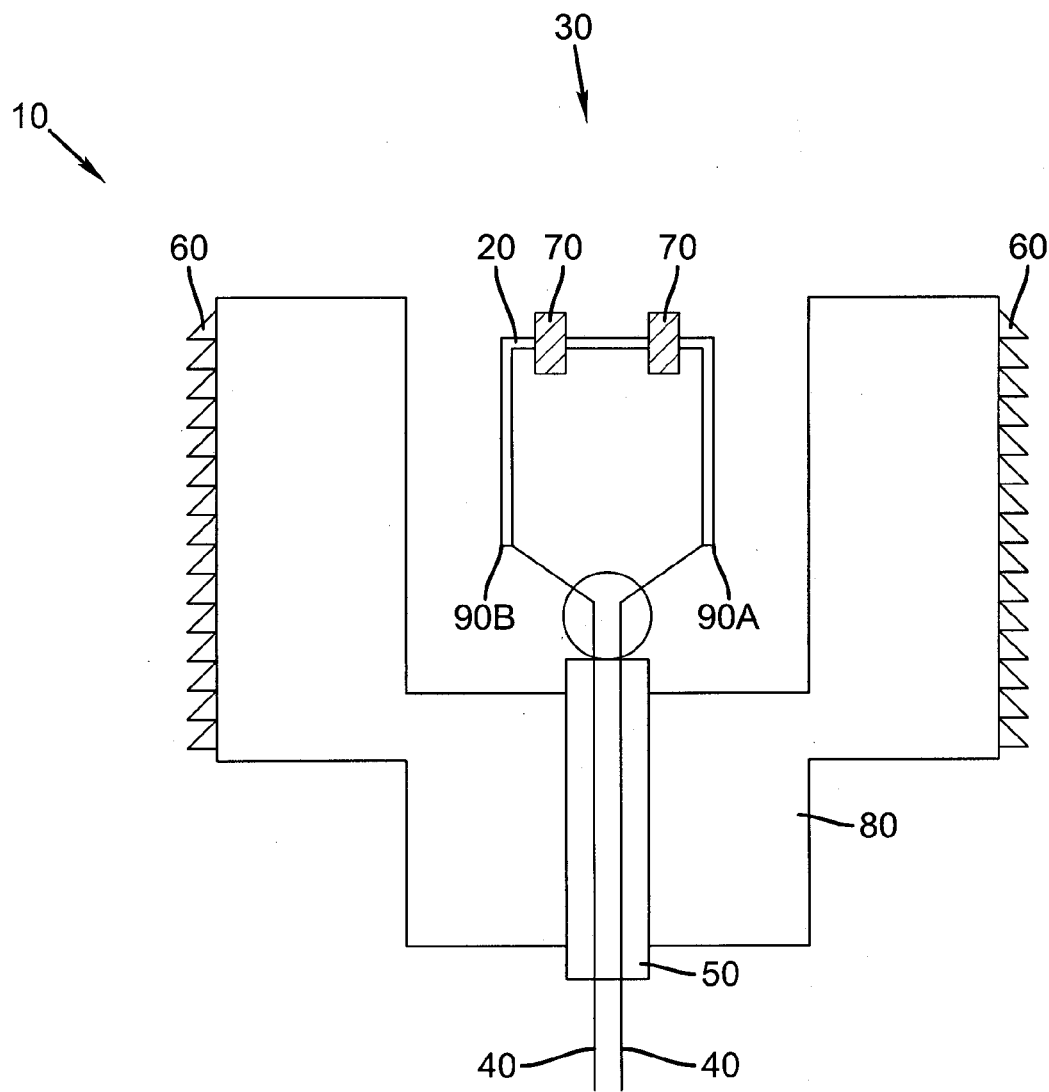
FIG. 1 shows a cross-sectional view of one embodiment of an extended filament unit for a vacuum gauge in accordance with this invention.
Figure 2:
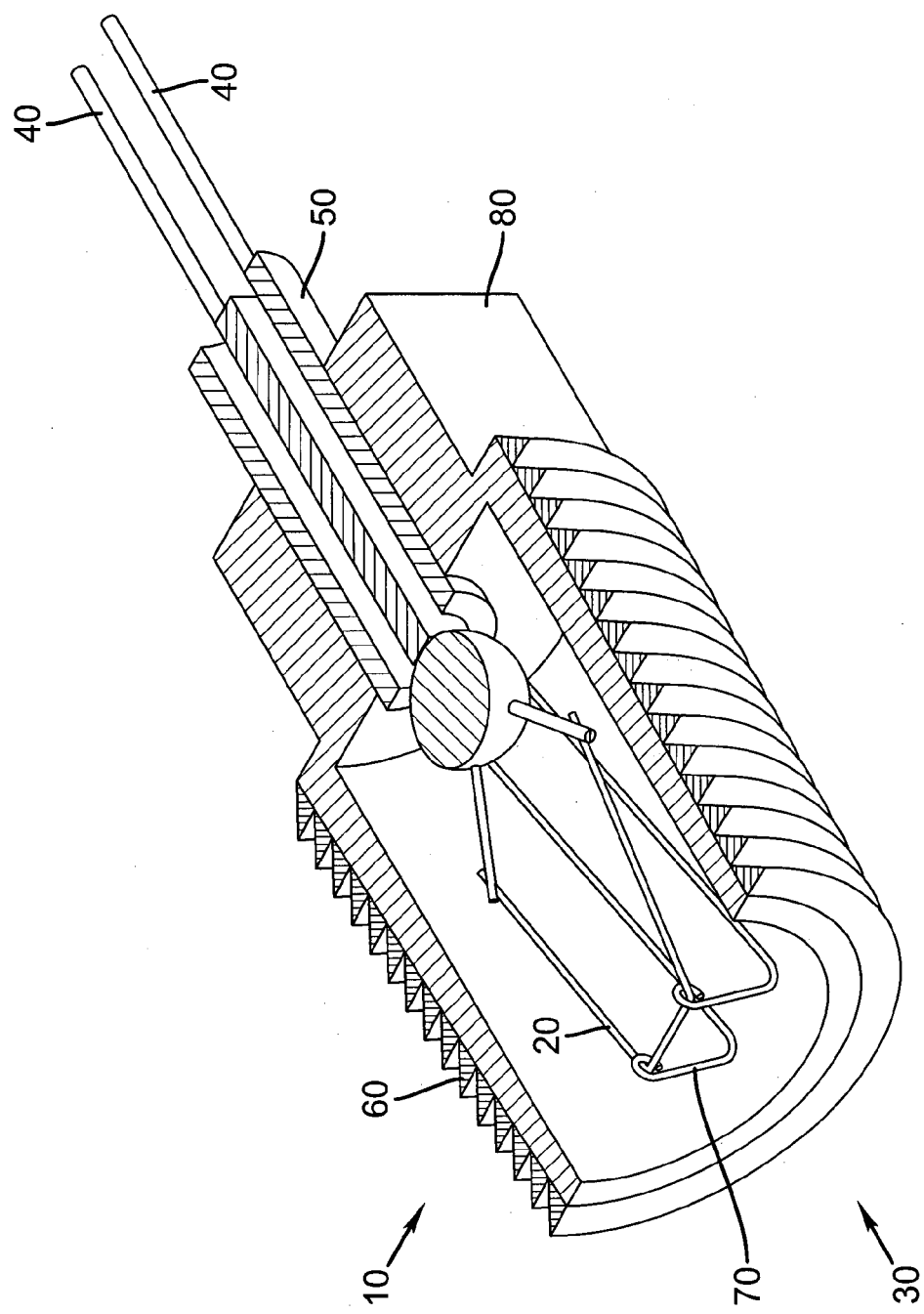
FIG. 2 shows a three-dimensional cross-sectional view of the extended filament unit of FIG. 1.

Turning now to FIG. 1, there is shown a cross-sectional view of one embodiment of one part of a vacuum gauge in accordance with this invention for measuring the pressure of vaporized organic material used in forming a layer of a device. Extended filament unit 10 is part of a vacuum gauge of the Pirani type and is designed to fit into a manifold. The unit includes an extended filament 20 in a dual-helix configuration, which will be described further below. The unit includes a housing 80 with a thread 60 that interfaces with the manifold to create a vacuum-tight seal that also acts to conduct heat from the manifold to the housing so that the manifold and housing are at essentially the same temperature. Opening 30 into the manifold permits the vacuum inside the manifold to contact filament 20 so that the filament is subject to the vaporized material inside the manifold. In one embodiment, the vaporized material inside the manifold is a vaporized organic material. Filament 20 is supported by supports 70 and connected to leads 40 through vacuum seal 50. Leads 40 are desirably formed of a metal with a low temperature coefficient of resistance, e.g. constantan. The term temperature coefficient of resistance refers to the dependency on temperature of the resistance of a material. It is represented by a in the equation $$\alpha = (T-T_0)[(R_T/R_0)-1]$$

where $R_0$ is the initial resistance of the metal, $T_0$ is the initial temperature, and $R_T$ is the resistance of the metal at temperature T. The term temperature coefficient of resistance is also known as temperature coefficient of resistivity, or sometimes simply temperature coefficient, and has a dimension of $°C.^{-1}$. The apparent length of filament 20, that is the distance from point 90A to 90B, is greater than 1 cm. Turning now to FIG. 2, there is shown a three-dimensional cross-sectional view of the extended filament unit of FIG. 1. In addition to the features shown in FIG. 1, FIG. 2 shows the manner in which supports 70 hold filament 20 in an extended position.

Figure 3:
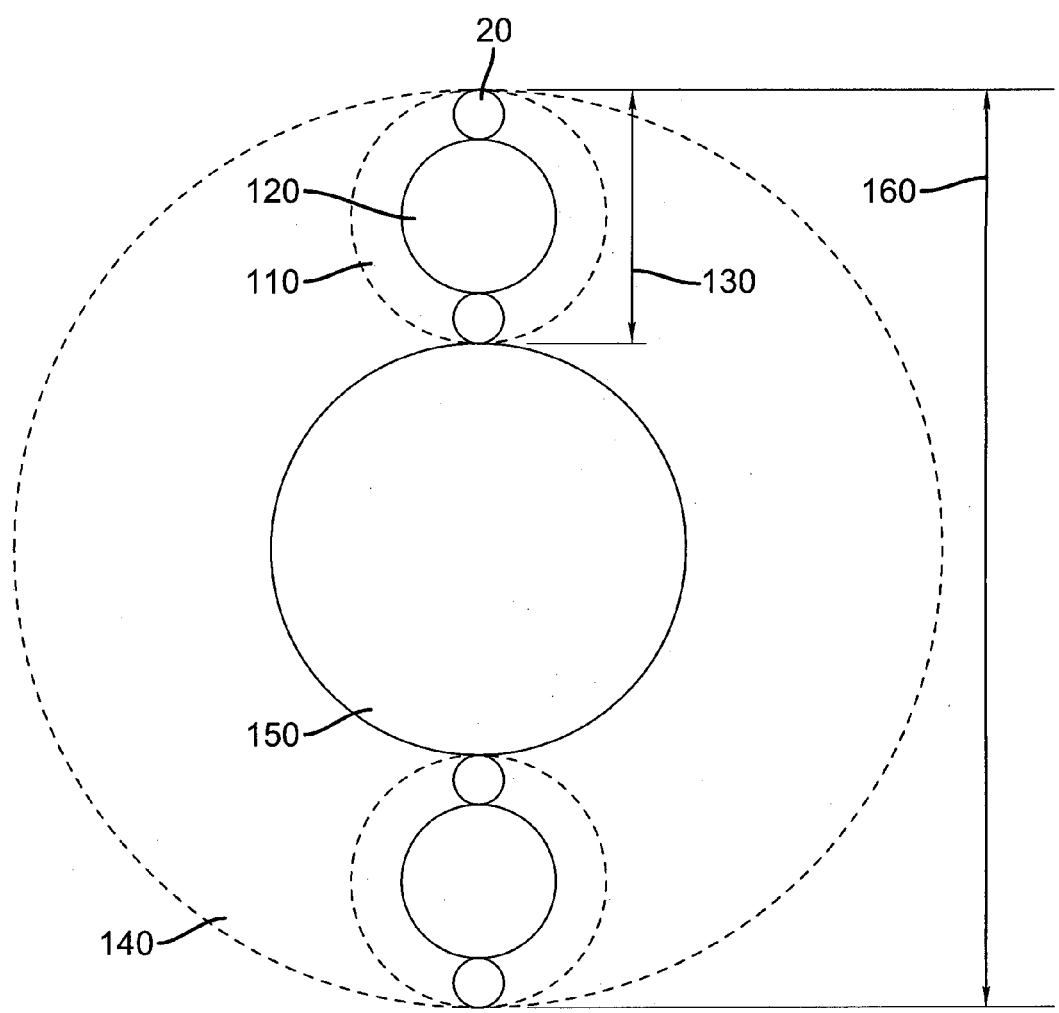
FIG. 3 shows a dual-helix configuration of a filament useful in this invention.

Filament 20 is conveniently helically wound, and desirably the resulting helix is formed into a second helix, which will also be referred to herein as a dual-helix configuration. This provides a relatively large surface area of wire exposed to the vapor in a short distance. Turning now to FIG. 3, there is shown such an arrangement. Filament 20 is a single strand of wire made from a metal with a temperature coefficient of resistance greater than 0.0035/° C. Metals meeting such requirements include tungsten, molybdenum, nickel, platinum, copper, iron, and certain alloys thereof, providing such alloys have the required temperature coefficient of resistance. Filament 20 has a thickness of 5 microns or less, and desirably 4 microns or less. Filament 20 can be helically wound, e.g. around a mandrel 120, to form a helix 110 of outer diameter 130. Outer diameter 130 is desirably 35 to 115 microns. The helically wound filament can then be further helically wound, e.g. around a larger mandrel 150, to further form a second helix 140 of outer diameter 160. Outer diameter 160 is desirably 125 to 375 microns. Such multiple coiling has been described previously, e.g. Sakai et al., U.S. Pat. No. 6,784,605, the contents of which are incorporated herein by reference.

Figure 4:
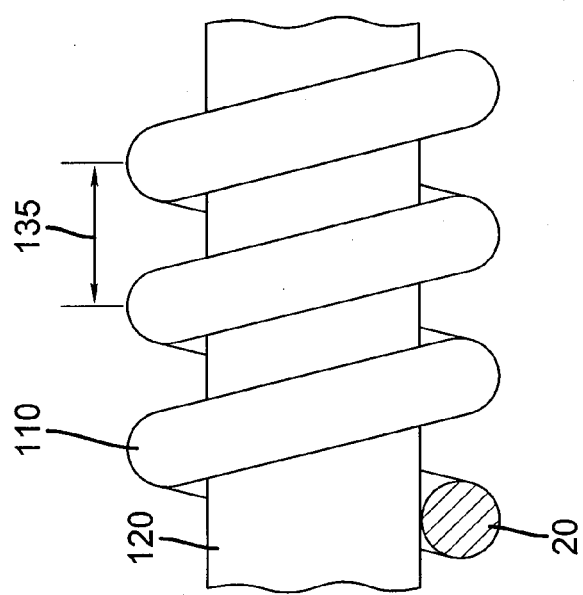
FIG. 4 shows a side view of a portion of the above dual-helix configuration.

Turning now to FIG. 4, there is shown a side view of a portion of the above dual-helix configuration. Filament 20 is helically wound around mandrel 120 to form helix 110 with a distance 135 between the coils of the helix. Distance 135 can be 1 to 3 times the diameter of helix 110, and is desirably 1.5 to 2 times the diameter. The resulting helix 110 can then be wound around a second mandrel to form a second helix, as described by Sakai et al.

In one embodiment, the dual-helix configuration filament can be provided by a commercially available incandescent lamp, such as a CM1 835 bulb, which is an industry standard miniature incandescent bulb that is designed to carry 55 volts and draw 50 milliamps.

Figure 5:
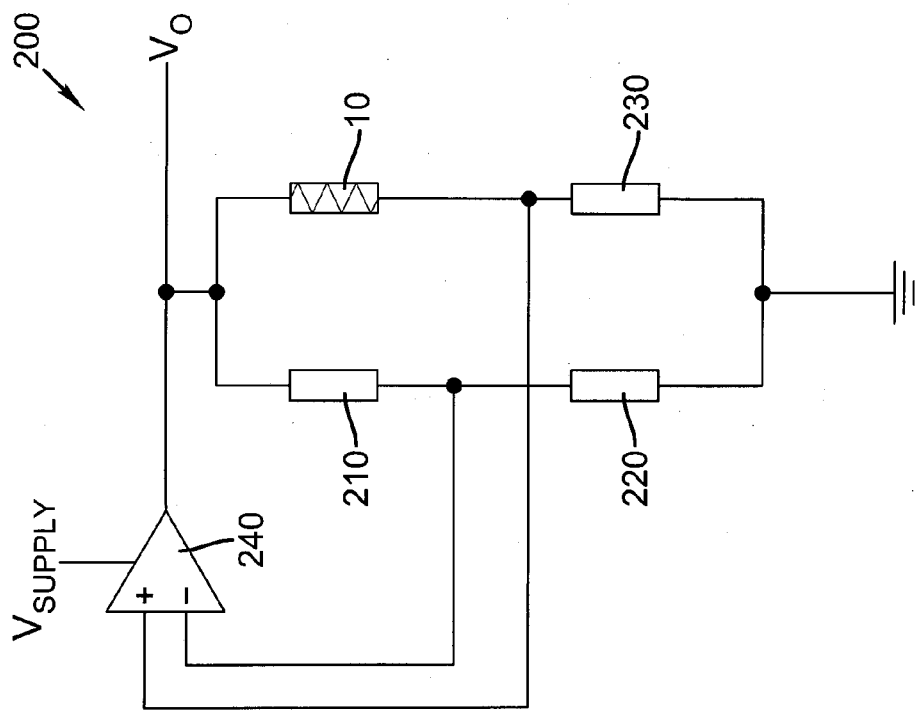
FIG. 5 shows a control circuit incorporating the filament into a vacuum gauge according to this invention.

Turning now to FIG. 5, there is shown a control circuit incorporating the filament into a vacuum gauge of the Pirani type according to this invention. Circuit 200 is a Wheatstone bridge circuit wherein resistors 210, 220, 230, and extended filament unit 10 are the four resistances. Circuit 200 serves two purposes. First, it is a mechanism for applying a current to filament 20. Second, it is responsive to a change in resistance to determine heat loss from filament 20. The current applied to the filament is selected such that the temperature of the filament is held at less than 650° C., so as not to degrade the molecular structure of vaporized organic material being deposited. Resistors 210, 220, and 230 are fixed resistances, and the resistance of extended filament unit 10 is the resistance of filament 20. The balanced condition of circuit 200 is given by the equation $R_{20}=R_{210} \times R_{230}/R_{220}$.

In use, differential amplifier 240 supplies the bridge with voltage, ensuring that the bridge remains balanced at all times. In this embodiment, the hot resistance of filament 20 is balanced so as to remain constant. Thus, circuit 200 serves as a mechanism for maintaining a constant filament temperature. This is governed by the constant resistances of the other arms of the bridge. Heat loss from the filament is a function of the pressure sensed by the filament, e.g. of the vaporized organic material. As the pressure at filament 20 increases, for example, the heat loss from the filament increases as a function of pressure of the vaporized organic material, causing a change in resistance of extended filament unit 10, and thus changing the current. Differential amplifier 240 is responsive to a change in current, and thus to a change in resistance, to determine the temperature change of the filament. Differential amplifier 240 will increase the voltage to the bridge to ensure its balance. In this mode of operation, the supplied voltage will be used to determine the heat loss from the filament. Calibration of the gauge will allow conversion of the supply voltage to pressure.

In the constant current mode, the circuit for applying current is a constant current source. Such constant current sources are well-known. The temperature of the filament starts, for example, at 620° C. at low pressures. As the pressure increases, the heat loss from the filament increases and the filament cools, which in turn decreases its resistance and forces the drive voltage to decrease. Thus, the drive voltage can be calibrated to the pressure.

In the constant voltage mode, the circuit for applying current is a constant voltage source. Such constant voltages are well-known. The temperature of the filament again starts, for example, at 620° C. at low pressures. As the pressure increases, the heat loss from the filament increases and the filament cools, which in turn decreases its resistance and forces an increase in the drive current. The increased current tends to counteract the cooling of the filament as the heating energy supplied to the filament increases, but this effect, using a tungsten filament, does not prevent a decrease in filament temperature with increasing pressure. Thus, the drive current can be calibrated to the pressure in this mode of operation.

Figure 6:
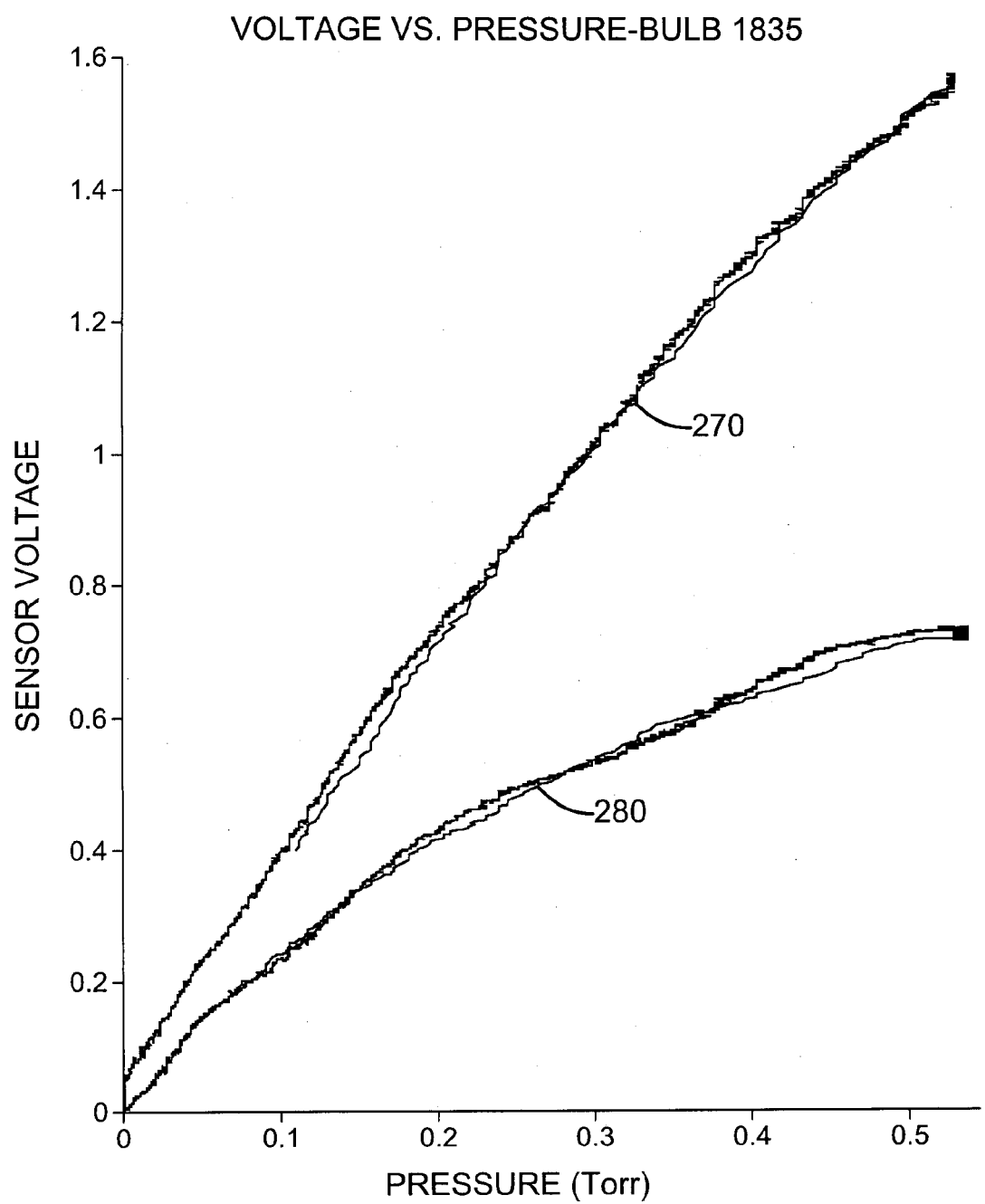
FIG. 6 shows a voltage vs. pressure graph for a filament of the type described here at two different filament temperatures.

Turning now to FIG. 6, there is shown a voltage vs. pressure graph for a filament of the type described here at two different initial filament temperatures when driven in a constant voltage mode. Curve 270 shows the response of the filament at 620° C., and curve 280 shows the response of the filament at 410° C. The temperature of the surrounding body of extended filament unit 10 (e.g. housing 80) was held at 400° C. In both cases, the curves were obtained by measuring the voltage across a fixed resistor in series with the filament while slowly raising the pressure in a nitrogen environment, and then by more rapidly reducing the pressure. These curves show that the filament responds similarly to slow or rapid changes in pressure, and that there is little or no hysteresis in reversing the direction of pressure change. In addition, curve 280 shows remarkably sensitive response when the difference between the temperature of filament 20 and housing 80 is only 10° C. The sensitivity shown in FIG. 6 is further improved when the sensor is operated in a constant temperature mode. The mechanism of this sensitivity is not understood and was not expected.

Figure 7:
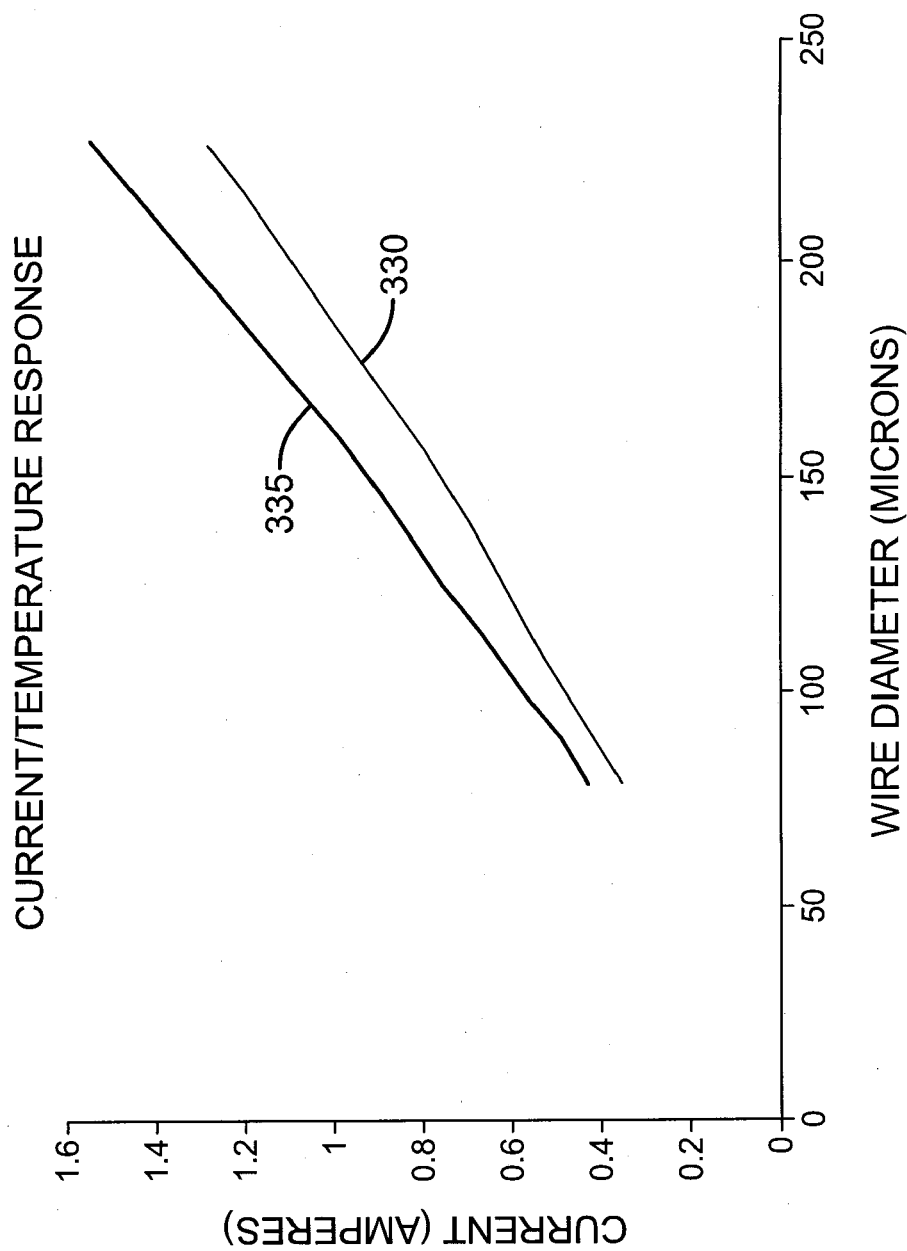
FIG. 7 shows a current vs. wire diameter graph for a straight nickel-chromium alloy wire filament at two different filament temperatures.

Turning now to FIG. 7, there is shown a graph of the equilibrium current of a wire vs. wire diameter for a straight nickel-chromium alloy filament at two different temperatures. Curve 330 is at 427° C., while curve 335 is at 538° C. At a given current, a decrease in wire diameter results in a dramatic increase in equilibrium temperature. As a result, a very small current produces high temperatures in fine wires. The current to drive a coiled wire to a given equilibrium temperature is approximately half that of a straight wire. So as the current to achieve a given filament temperature becomes vanishingly small with decreasing wire diameter and with a coiled filament geometry, the total power available per unit length to heat the wire also becomes vanishingly small. At the same time, the ratio of surface area to cross sectional area increases with decreasing wire diameter. So while the cross-sectional area and heating power per unit length are decreasing with decreasing wire diameter, the relative influence of the surface area available for heat transfer is increasing.

This vanishingly small heating power per unit length and increasing relative importance of the surface area in very fine wires is believed to be responsible for the exceptional sensitivity of the sensor of this disclosure to changes in the thermal conductivity of the gas to be measured. The length of the filament is believed to be of secondary importance relative to the filament diameter. Although, prior art Pirani gages have attained sensitivity by maximizing the temperature differential between the filament and its surroundings, the present invention attains comparable sensitivity without resorting to filament temperatures that are destructive to organic vapors.

Figure 8B:
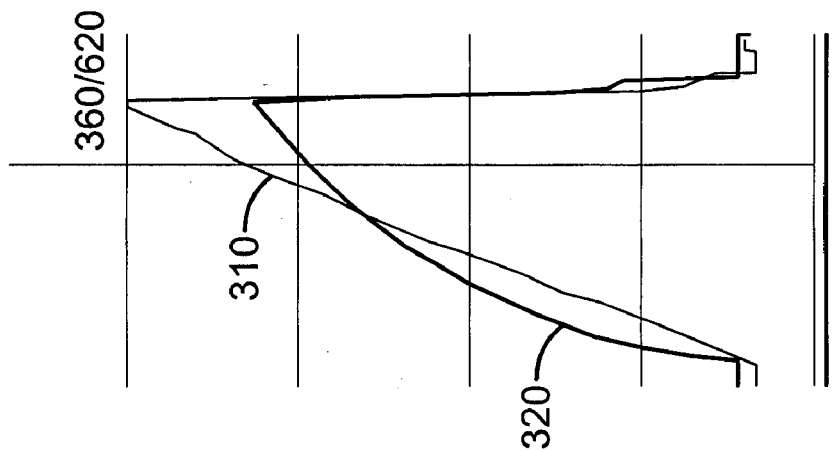
FIGS. 8A and 8B show two voltage vs. pressure graphs for a filament of the type described here in comparison to a commercial Pirani gauge.
Figure 8A:
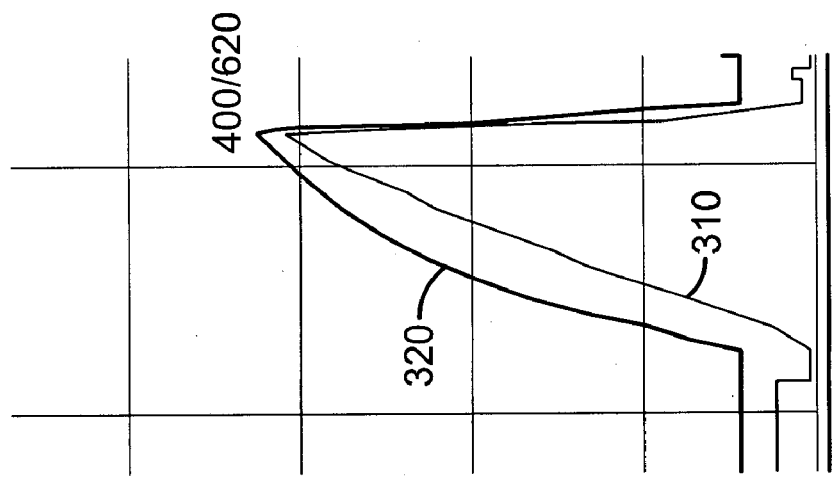

Turning now to FIGS. 8A and 8B, there are shown two voltage vs. pressure graphs for a filament of the type described here (Curve 310 in both graphs) in comparison to a commercial Pirani gauge (Curve 320 in both graphs). The initial filament 20 temperature in both cases is 620° C. The temperature of housing 80 is 400° C. in FIG. 8A, and 360° C. in FIG. 8B. In both graphs, the body of the commercial Pirani gauge is maintained at room temperature, while the sensing element operates at approximately 1700° C. The range of pressure measured is from 1 to 500 micro-Torr. The data show that the response of the pressure gauge of this invention when operated in a constant voltage mode has a sensitivity on the same order as a commercial Pirani gauge. However, the pressure gauge of the present invention has a filament that operates below 650° C. and gives effective response. Although this invention is particularly advantageous for measuring the pressure of organic materials, it can also be used for measuring the pressure of inorganic materials that vaporize at lower temperatures than the temperature of the filament, e.g. lithium under vacuum conditions. The commercial Pirani gauge has a sensing element that operates at approximately 1700° C., making it unsuitable for measuring the pressure of vaporized organic materials.

Figure 9:
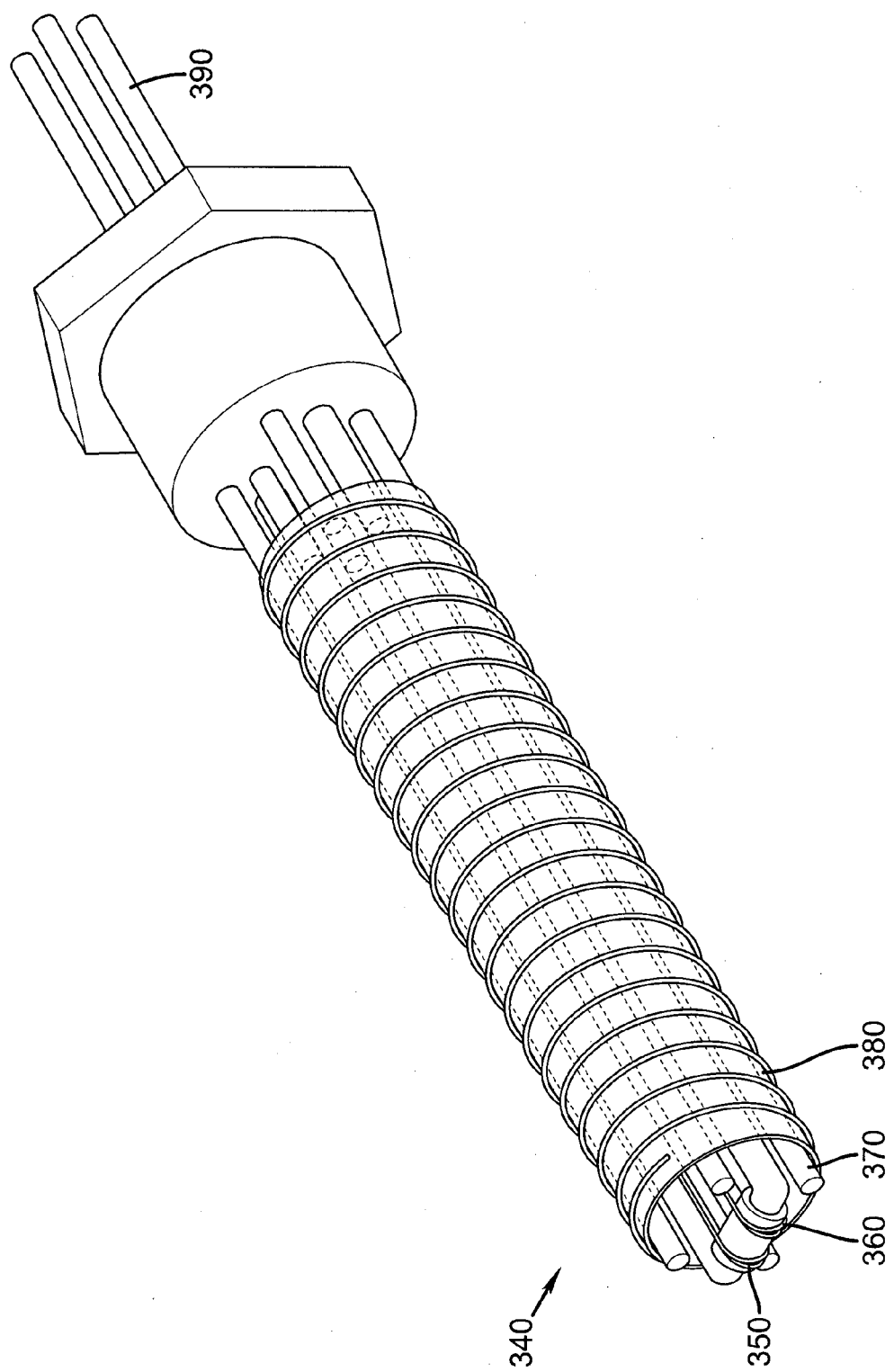
FIG. 9 shows a three-dimensional view of another embodiment of an extended filament unit for a vacuum gauge in accordance with this invention.

Turning now to FIG. 9, there is shown a three-dimensional view of another embodiment of an extended filament unit for a vacuum gauge in accordance with this invention. Extended filament unit 340 employs two closely spaced filaments, e.g. filaments 350 and 360, with the same temperature coefficient of resistance, but with different resistances. This can be achieved by making the filaments of the same metal with a slightly different diameter wire. The filaments include a metal with a temperature coefficient of resistance greater than 0.0035/° C., as described above. In one embodiment, filaments 350 and 360 include tungsten wire with 35 and 37 micron diameters respectively that has been helically wound with a helix diameter of 180 microns. Filaments 350 and 360 each have an apparent length of 65 mm and are connected in series, and a common current passing through them will cause them to be heated to different temperatures, e.g. filament 350 can be heated to 600° C. while filament 360 can be heated to 500° C. The filaments are supported on ceramic supports 370, parallel to each other with a separation of 1 mm, and are enclosed in heated shield 380, which includes a heating element to maintain the shield at a constant temperature. The filaments are connected to leads 390, which are desirably a metal with a low temperature coefficient of resistance, e.g. constantan, to couple extended filament unit 340 to remote drive and measurement electronics. Filaments 350 and 360 comprise two active elements in one arm of a Wheatstone bridge in which an increase in resistance in one active element is accompanied by a decrease in resistance of the other active element. The current through the series-connected filaments is equal, and the surface areas of the filaments in the helical configuration are substantially equal. The heat energy delivered to each of filaments 350 and 360 is given by the square of the current passing through it times its resistance, so the temperature ratio of the two elements will equal their resistance ratio wherein radiation and end conduction losses can be ignored. This is a reasonable approximation in this application since all of the elements of extended filament unit 340, including heated shield 380, must be heated to within a few hundred degrees of each other to avoid both condensation and degradation of the organic material. The gas conduction heat loss to heated shield 340 from each filament 350 and 360 is proportional to the temperature difference between the filament and the heated shield, so the change in resistance of the filaments due to gas conduction to heated shield 380 will be proportional to the filament resistance. Under these conditions, the ratio of the resistance values for the two filaments will remain constant in response to temperature variations of heated shield 380, and only change in response to thermal conductivity changes in the surrounding gas. It is therefore possible to isolate pressure-induced changes in heat transfer from enclosure-temperature-induced changes.

Extended filament unit 340 shows very good sensitivity to pressure when the temperature of heated shield 380 is greater than 100° C. below the temperature of the lower-temperature filament. Thus, if the filaments are at 600° C. and 500° C., heated shield 380 should be less than 400° C. Therefore, extended filament unit 340 can be used very successfully at room temperature, or with materials that vaporize at relatively low temperatures. However, the temperature of heated shield 380 must be high enough to prevent condensation of the materials on the shield, while the temperature of the higher temperature filament must be low enough to prevent decomposition of the vaporized materials. Therefore, the sensitivity of this device to the pressure of vaporized organic materials that require a vaporization temperature above approximately 400° C. will be reduced.

The invention has been described in detail with particular reference to certain preferred embodiments thereof, but it will be understood that variations and modifications can be effected within the spirit and scope of the invention.

PARTS LIST 10 extended filament unit
20 extended filament
30 opening
40 leads
50 vacuum seal
60 thread
70 supports
80 housing
90A point
90B point
110 helix
120 mandrel
130 outer diameter
135 distance
140 helix
150 mandrel
160 outer diameter
200 circuit
210 resistor
220 resistor
230 resistor
240 differential amplifier
270 curve
280 curve
310 curve
320 curve
330 curve
335 curve
340 extended filament unit
350 filament
360 filament
370 ceramic support
380 heated shield
390 leads

The invention claimed is:

1. A vacuum gauge of the Pirani type for measuring the pressure of vaporized organic or inorganic material used in forming a layer of a device, comprising:
   a) an extended filament having a thickness of 5 microns or less and having a temperature coefficient of resistance greater than 0.0035/° C., the filament being subject to the vaporized organic or inorganic material;
   b) means for applying a current to the filament so that the temperature of the filament is less than 650° C. so as not to degrade the molecular structure of the organic material; and
   c) means responsive to a change in resistance or a change in current to determine heat loss from the filament, which is a function of the pressure of the vaporized organic or inorganic material.

2. The vacuum gauge of claim 1 wherein the filament is helically wound.

3. The vacuum gauge of claim 2 wherein the helically wound filament is further formed into a second helix.

4. The vacuum gauge of claim 3 wherein the helically wound filament has an apparent length of greater than 1 cm.

5. The vacuum gauge of claim 1 wherein the current applying means is a constant current source.

6. The vacuum gauge of claim 1 wherein the current applying means further includes a circuit for maintaining a constant filament temperature.

7. The vacuum gauge of claim 1 wherein the filament is made from tungsten, molybdenum, nickel, platinum, copper, iron, or alloys thereof which have the required temperature coefficient of resistance.

8. The vacuum gauge of claim 1 wherein the filament has a thickness of 4 microns or less.

* * * * *